United States Patent [19]
Fuchs et al.

[11] Patent Number: 5,624,191
[45] Date of Patent: Apr. 29, 1997

[54] METAL LUBRICATED PLAIN BEARING HAVING A BEARING PART ADJOINING A BEARING SURFACE WETTED WITH LIQUID METAL DURING OPERATION

[75] Inventors: Manfred Fuchs, Nuremberg; Erich Hell, Erlangen, both of Germany

[73] Assignee: Siemens Aktiengesellschaft, Munich, Germany

[21] Appl. No.: 500,587

[22] Filed: Jul. 11, 1995

[30] Foreign Application Priority Data

Jul. 12, 1994 [DE] Germany ............. 44 24 507.6

[51] Int. Cl.⁶ ............. F16C 32/06; H01J 35/10
[52] U.S. Cl. ............. 384/100; 384/132; 384/368; 378/133
[58] Field of Search ............. 384/100, 107, 384/132, 368; 378/132, 133

[56] References Cited

U.S. PATENT DOCUMENTS

| | | | |
|---|---|---|---|
| 4,614,445 | 9/1986 | Gerkema et al. | 384/368 |
| 4,856,039 | 8/1989 | Roelandse et al. | 378/133 |
| 5,181,235 | 1/1993 | Ono et al. | 378/133 |
| 5,204,890 | 4/1993 | Anno et al. | 378/133 |

FOREIGN PATENT DOCUMENTS

| | | |
|---|---|---|
| 361088 | 11/1978 | Austria. |
| 0479197 | 4/1992 | European Pat. Off. . |
| OS2852908 | 6/1979 | Germany. |
| OS3842034 | 6/1990 | Germany. |

*Primary Examiner*—Thomas R. Hannon
*Attorney, Agent, or Firm*—Hill, Steadman & Simpson

[57] ABSTRACT

The invention is directed to a plain bearing part for a liquid metal lubricated plain bearing, the plain bearing part having a bearing surface that is in contact with a liquid metal during operation. This bearing surface is provided with a layer of a metal effective as diffusion barrier for the liquid metal and which is well wetted with the liquid metal. The layer is applied according to a PVD process.

8 Claims, 2 Drawing Sheets

METAL LUBRICATED PLAIN BEARING HAVING A BEARING PART ADJOINING A BEARING SURFACE WETTED WITH LIQUID METAL DURING OPERATION

BACKGROUND OF THE INVENTION

1. Field of the Invention

The present invention is directed to a liquid metal lubricated plain bearing, and in particular to a part for such a bearing having a surface which adjoins a bearing surface wetted with liquid metal during operation.

2. Description of the Prior Art

Liquid metal lubricated bearings, for example, are employed in x-ray tubes for bearing the rotating anode and are thereby normally accepted in the inside of the vacuum housing of the x-ray tube. An advantage of such liquid metal lubricated plain bearings is their capability of eliminating the dissipated heat that arises in the region of the rotating anode during the generation of x-rays. Gallium, indium or tin alloys that are liquid at room temperature are usually employed as the liquid metal. One problem given such liquid metal plain bearings is that of assuring an adequately high wettability of the bearing surfaces of the plain bearing parts with the liquid metal. As used herein, "bearing surfaces" means those surfaces of the plain bearing parts between which liquid metal must be situated in order to assure a proper operation of the liquid metal lubricated plain bearing. When an adequate wettability of the bearing surfaces is not assured, the liquid metal lubricated plain bearing cannot be completely filled with liquid metal. It is thus then not assured that the bearing surfaces will be wetted completely with liquid metal, leading to a reduction in the supporting capability of the liquid metal plain bearing. Given inadequate wettability of the bearing surfaces, moreover, there is the risk that liquid metal will run out during operation of the bearing surface because the liquid metal film tears off from the bearing surfaces. Additionally, liquid metals are in part extremely reactive, so that they may not wet bearing surface under certain circumstances but will react with the material of the plain bearing part in the region of the bearing surface (gallium is especially highly reactive).

German OS 28 52 908 discloses a liquid metal lubricated plain bearing for the rotating anode of an x-ray tube. The plain bearing parts thereof are composed of molybdenum, because of the good vacuum compatibility of this material and because of the wetting angle of contact between the liquid metal and an oxide-free bearing surface of molybdenum that lies relatively favorable at approximately 100°. Since a thin oxide film forms on bearing surfaces of molybdenum when stored in air or in an atmosphere that contains water vapor, this thin oxide film deteriorating the wettability of the bearing surface with liquid metal, the bearing surfaces are annealed at temperatures of approximately 800° C. in hydrogen or in an atmosphere that contains hydrogen. Subsequently, the parts are stored in a reducing atmosphere until they are employed in order to prevent a renewed occurrence of an oxide layer. A disadvantage is that one is restricted to a specific material for the plain bearing parts.

German OS 38 42 034 and Austrian Patent 361 088 likewise disclose the use of molybdenum as the raw material for the plain bearing part of a liquid metal lubricated plain bearing. Austrian Patent 361 088 also cites tungsten as a suitable material.

A different approach is used in a liquid metal lubricated plain bearing for the rotating anode of an x-ray tube disclosed in European Application 0 479 197. In that bearing, the wettability of the bearing surfaces is produced by providing the plain bearing parts with a coating composed of a carbide, boride or nitride in the region of the bearing surfaces. This is achieved, for example, by coating the plain bearing parts at their bearing surfaces coated using a PVD method (physical vapor deposition, i.e., physical layer deposition in a vacuum). Virtually arbitrary materials can thus be employed for the plain bearing parts, insofar as it is merely assured that these can be provided with a firmly adhering carbide, boride or nitride layer. It has turned out, however, that such liquid metal lubricated plain bearings fall short of expectations in view of their capability of eliminating dissipated heat from the rotating anode.

SUMMARY OF THE INVENTION

It is an object of the present invention to provide a plain bearing part of the type initially cited which precludes reactions of the liquid metal with the material of the plain bearing.

It is a further object to provide such a plain bearing part a good wettability of the bearing surface with the liquid metal is guaranteed.

Another object is to provide such a plain bearing part which permits different materials to be employed for the bearing part.

A further object is to provide a plain bearing part which permits a liquid metal lubricated plain bearing to be formed incorporating the bearing part which eliminates dissipated heat arising in the region of the rotating anode well, given employment in a rotating anode x-ray tube.

These objects are inventively achieved by a plain bearing part for a liquid metal lubricated plain bearing, the plain bearing part having a bearing surface in contact with a liquid metal during operation that is provided with a layer of a metal that can be wetted well with the liquid metal and which is also effective as a diffusion barrier for the liquid metal, the layer being applied by a PVD process. As a consequence of the diffusion barrier, the liquid metal is prevented from penetrating to the base material, i.e., to the material of the plain bearing part, and reacting therewith, for example forming an alloy. At the same time, the diffusion barrier assures a good wettability with the liquid metal. As used herein "good wettability" means/a wetting angle, i.e. a wetting angle of contact, of at most approximately 100°. Since the layer is applied according to a PVD process— including techniques such as vapor-deposition in a high-vacuum and what is referred to as sputtering (cathode atomization)—, the layer has a constant and defined thickness. As a result, a constant and defined width of the bearing gap is assured when a liquid metal plain bearing is assembled of inventive plain bearing parts. Layers applied according to a PVD process, moreover, also offer the advantage that they adhere firmly to surfaces that are cleaned in a conventional way, for example by washing and/or vacuum baking. Layers applied according to a PVD process, moreover, contain substantially no contaminants and/or gas inclusions. Due to the high homogeneity of the layer and the good adhesion of the layer to the plain bearing part, only slight abrasion of the layer applied in the region of the bearing surface of a plain bearing part occurs during the service life of the liquid metal plain bearing. The liquid metal film can thus not tear off from the bearing surface due to outgassing from cavities (pores) of the basic material of the plain bearing part. Further, the stoichiometric relationships can be exactly observed in the PVD method when the layer is composed of an alloy or compound. As a consequence of the fact that the layer of the inventive plain bearing part contains no significant gas inclusions and there is no significant risk that gas contained in the base material of the plain bearing part can become freed due to wear, inventive plain bearing parts are particularly suitable for employment in vacuum technology and in x-ray tube technology (rotating anode bearing). Since a metal is provided as the material effective as a diffusion barrier, dissipated heat arising during operation, particularly when the device part is employed in a liquid metal lubricated plain bearing serving the purpose of bearing the rotating anode of an x-ray tube, can be eliminated well via the liquid metal lubricated plain bearing.

In this context, in one version of the invention the metal effective as a diffusion barrier has a thermal conductivity $\lambda$ of at least 100 W/(m·K). A good thermal conductivity of the metal acting as a diffusion barrier is especially required when the base material of the plain bearing part has a low thermal conductivity and/or when the plain bearing is employed in a rotating anode x-ray tube. When employed in a rotating anode x-ray tube, the liquid metal plain bearing— as already indicated—assumes the function of a heat exchanger and then serves the purpose of eliminating at least a part of the dissipated heat that arises in the generation of x-radiation on the anode.

According to embodiments of the invention, tungsten or a tungsten alloy, or molybdenum or a molybdenum alloy, is provided as the metal acting as a diffusion barrier. Apart from the fact that they are effective as a diffusion barrier with respect to the liquid metal, these metals offer the desired properties with respect to the wettability and the thermal conductivity.

It is especially advantageous when the metal acting as diffusion barrier is identical to the base material of the plain bearing part. Problems due to different coefficients of thermal expansion, undesirable chemical reactions and adhesion problems of the diffusion barrier on the base material, are then avoided from the outset.

No particular demands are made of the base material of the plain bearing part unless the liquid metal plain bearing assembled from the plain bearing part is to be utilized in a rotating anode x-ray tube. In a version of the invention for this use, the plain bearing part is formed of a base material of molybdenum, tungsten, tantalum, rhenium, an alloy containing at least one of these metals, stainless steel, aluminum, copper or ceramic. These materials then exhibit the required vacuum compatibility.

DESCRIPTION OF THE PREFERRED EMBODIMENTS

Figure 1:
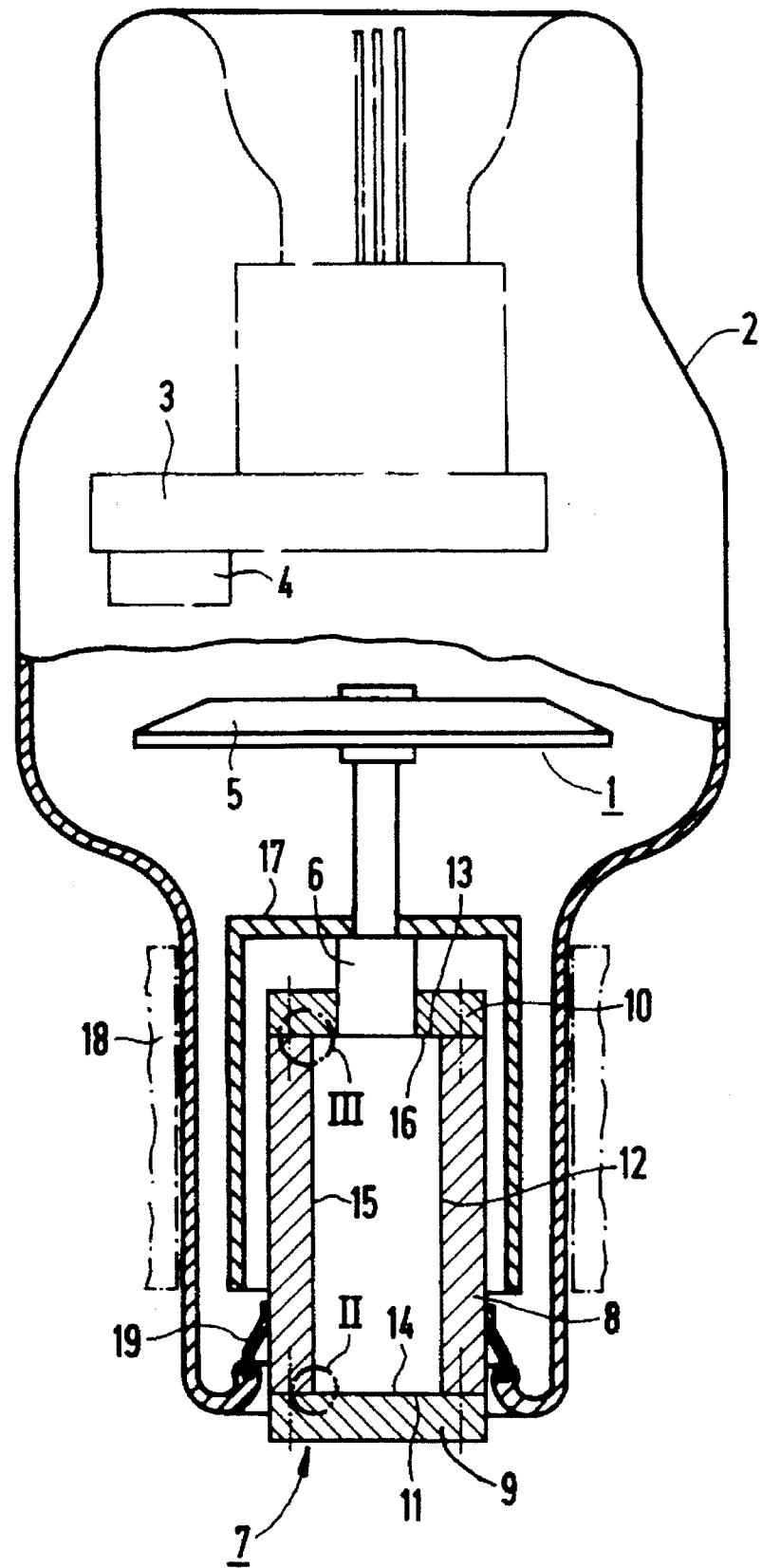
FIG. 1 is a longitudinal section through a rotating anode x-ray tube having a liquid metal plain lubricated bearing for the rotating anode composed of inventive bearing parts, shown partially in section.

FIG. 1 shows a rotating anode x-ray tube that has a rotating anode 1 that is accommodated in a vacuum bulb 2. In a known arrangement, the vacuum bulb 2 also contains a cathode 3 that contains a glow coil (not visible in FIG. 1) in a cathode cup 4.

The rotating anode 1 has an anode dish 5 that is firmly attached to a bearing shaft 6 at one end thereof. In order to assure the rotatable bearing of the rotating anode 1, a liquid metal lubricated plain bearing generally referenced 7 is provided, this being composed of a number of plain bearing parts, the bearing shaft 6 being one thereof. A tube part 8, a base 9 and a cover 10 are provided as further plain bearing parts.

The tube part 8, the base 9 and the cover 10, provided with a bore, are screwed together (only the center lines of some screws being shown) so that the thickened end of the bearing shaft 6 extending through the bore of the cover 10 is accepted in the bore of the tube part 8. The planar inside of the base 10, the hollow-cylindrical bore wall of the tube part 8 and the annular, planar inside of the cover 10 thereby respectively form first bearing surfaces 11, 12 and 13. The planar, circular end face provided at the other end of the bearing shaft 6, the cylindrical surface of the thickened shoulder of the bearing shaft 6, and the annular, planar end face of the projection of the bearing shaft 6 leading to the thickened shoulder respectively form second bearing surfaces 14, 15 and 16.

A bearing gap (not visible in FIG. 1) that is filled with liquid metal is located between the combination bearing surfaces 11–13 and the combination of the bearing surfaces 14–16.

An electric motor is provided in order to be able to place the rotating anode 1 into rotation, this electric motor being formed by a hollow cylindrical component of an electrically conductive material forming a rotor 17 that overlaps that end of the tube part 8 provided with the cover 10. The schematically indicated stator 18 is put in place onto the outside wall of the vacuum bulb in the region of the rotor 17 and forms an electrical squirrel cage motor together with the rotor 17 that allows the rotating anode I to rotate when supplied with appropriate current.

The plain bearing parts, i.e. the bearing shaft 6, the tube part 8, the base 9 and the cover 10, are formed of a material such as molybdenum, tungsten, tantalum, rhenium, an alloy containing at least one of these metals, stainless steel, aluminum, copper or ceramic. The bearing pans are preferably formed of molybdenum or of an alloy containing molybdenum, in view of the vacuum compatibility of these materials as base materials.

Figure 2:
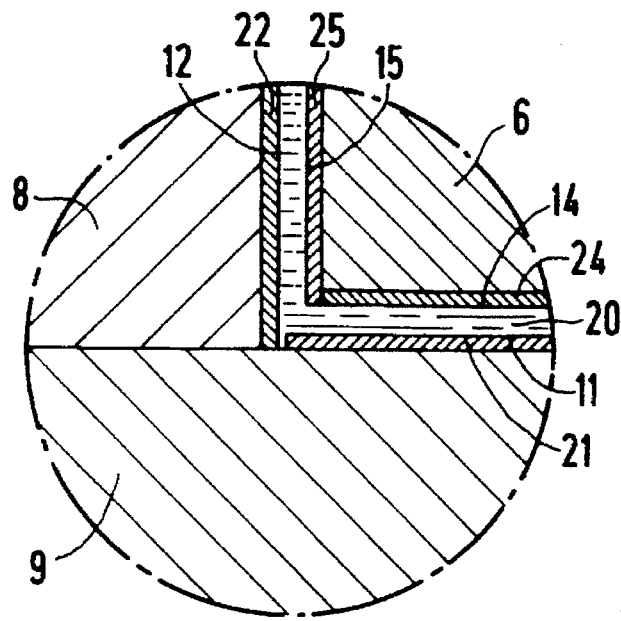
FIGS. 2 and 3 respectively show details II and III of FIG. 1 enlarged.
Figure 3:
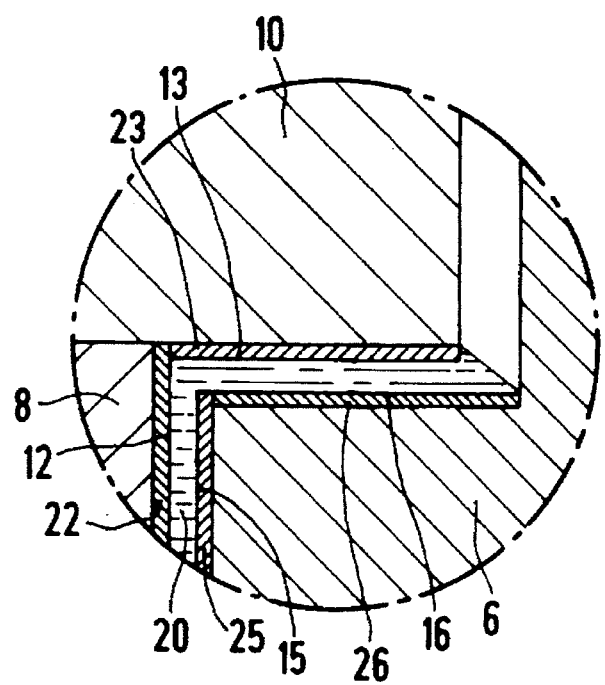

Respective layers 21–26 of a material that is effective as a diffusion barrier for the liquid metal 20 and can be wetted well with the liquid metal 20 are applied on the base material of the plain bearing parts in the region of their bearing surfaces 11–13 and 14–16 as shown in FIGS. 2 and 3. The layers 21–26 prevent the liquid metal 20 from reacting with the base material of the plain bearing parts 6 and 8–10. At the same time, a good wetting of the bearing surfaces 11–16 is guaranteed, so that the risk that liquid metal 20 will emerge from the bearing gap is slight. In order to assure a good elimination of the dissipated heat arising during generation of the x-radiation—only approximately 1% of the electrical energy supplied to the x-ray tube is converted into x-radiation—, the layers should be composed of a material that has a thermal conductivity $\lambda$ of at least 100 W/(m·K).

The layers 21–26 are formed of tungsten or of a tungsten alloy, or of molybdenum or of a molybdenum alloy and are produced according to a PVD method. Given molybdenum as the material for the plain bearing parts, molybdenum is especially suitable as the material for the layers 21–26. In this case, the layers 21–26 are preferably generated by sputtering with a magnetron sputter source. In addition to a high uniformity of the layers 21–26, a rapid growth in layer thickness is then also assured. The sputtering process is implemented in a pressure range between $2 \cdot 10^{-3}$ mbar and $5 \cdot 10^{-2}$ mbar. The negative voltage at the magnetron amounts to between 200 and 1200 V. The monitoring of the layer thickness and the identification of the growth in layer thickness per time unit ensue in a known way using a quartz resonator.

Under the above conditions, molybdenum layers having a thickness between 100 nm (the minimum thickness required for functioning as the diffusion barrier) and 2000 nm (thicker layers no longer adhere well) can be produced. For preparation of the surfaces to be coated on the plain bearing parts formed of molybdenum, it is adequate to subject these to a washing process or to bake them in a vacuum. Oxide films of the base material molybdenum, which would result in a poor wettability with the liquid metal, need not be removed (reduction in hydrogen, ion bombardment).

Insofar as possible, the layers produced in this way must not come into contact with atmospheric oxygen or with water vapor or can only come briefly into contact therewith.

Moreover, there is also the possibility of selecting the thicknesses of the layers 21–26—taking the manufacturing tolerances of the plain bearing parts into consideration—such that gap widths between the bearing surfaces 11 and 14, 12 and 15 as well as the surfaces 13 and 16 that are especially advantageous for the operation of the liquid metal lubricated plain bearing 7 are achieved.

In detail, the diameter of the bearing surfaces 12 and 15 can be varied by 3.8 μm given the aforementioned ranges of layer thickness. The spacing of the bearing surfaces 11 and 14, or 13 and 16, from one another can be respectively varied by 3.8 μm.

Moreover, the bearing surfaces 11–16 can be provided with channels, particularly helical channels, in a way that is known and not shown in the figures, these channels serving the purpose of preventing the liquid metal from emerging from the bearing gap.

In the case of the described exemplary embodiment, the respective bearing surfaces 11–16 are respectively immediately adjacent to at least one other bearing surface (for example, the bearing surface 15 is immediately adjacent to the bearing surfaces 14 and 16). This need not necessarily be the case. Interstices or spacings can be present.

In the case of the described exemplary embodiment, the layers respective 21–26 are also immediately adjacent to at least one further layer (for example, the layer 25 is immediately adjacent to the layers 24 and 26). This, too, need not necessarily be the case. Interstices or spacings can also be present here. The interstices or spacings between neighboring layers are then realized with what are referred to as deposition masks that protect the surfaces of the base material lying therebelow from the vapor or particle beam.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a liquid metal-lubricated plain bearing, the improvement comprising a plain bearing part having a bearing surface in contact with a liquid metal during operation, said bearing surface of said plain bearing part having a metal layer applied to said bearing surface by physical vapor deposition and forming a diffusion barrier for said liquid metal and being well wetted by said liquid metal.

2. The improvement of claim 1 wherein said metal layer is composed of a metal having a thermal conductivity of at least 100 W/(m·k).

3. The improvement of claim 1 wherein said metal layer is composed of material selected from the group consisting of tungsten and tungsten alloys.

4. The improvement of claim 1 wherein said metal layer is composed of material selected from the group consisting of molybdenum and molybdenum alloys.

5. The improvement of claim 1 wherein said plain bearing part is composed of a base material, and wherein said base material is the same as the material composing said metal layer.

6. The improvement of claim 1 wherein said plain bearing part is composed of a base material selected from the group consisting of molybdenum, tungsten, tantalum, rhenium, alloys of molybdenum, tungsten, tantalum and rhenium, stainless steel, aluminum, copper and ceramic.

7. A rotating anode x-ray tube having a rotating anode and at least one liquid metal-lubricated plain bearing which rotatingly supports said rotating anode, said plain bearing having a plain bearing part having a bearing surface in contact with a liquid metal during operation, said bearing surface being covered by a metal layer applied to said plain bearing part by physical vapor deposition forming a diffusion barrier for the liquid metal and being well wetted by said liquid metal.

8. A method for making a liquid metal-lubricated plain bearing comprising the steps of:

providing a plain bearing part having a bearing surface in contact with a liquid metal;

applying a metal layer to said plain bearing part covering said plain bearing surface by physical vapor deposition; and selecting a material for said metal layer which forms a diffusion barrier for said liquid metal and which is well wetted by said liquid metal.

* * * * *